United States Patent
Alidedeoglu et al.

(10) Patent No.: US 10,093,797 B2
(45) Date of Patent: *Oct. 9, 2018

(54) HYDROSTABILITY OF POLYCARBONATE POLYESTER COMPOSITION

(71) Applicant: SABIC Global Technologies B.V., Bergen Op Zoom (NL)

(72) Inventors: Husnu Alp Alidedeoglu, Evansville, IN (US); Tianhua Ding, Newburgh, IN (US); Ganesh Kannan, Evansville, IN (US)

(73) Assignee: SABIC Global Technologies B.V., Pittsfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,552

(22) Filed: Oct. 7, 2015

(65) Prior Publication Data

US 2016/0024296 A1 Jan. 28, 2016

Related U.S. Application Data

(63) Continuation of application No. 13/950,927, filed on Jul. 25, 2013, now abandoned.

(Continued)

(51) Int. Cl.

| | |
|---|---|
| *C08F 299/04* | (2006.01) |
| *C08L 67/02* | (2006.01) |
| *C08G 63/85* | (2006.01) |
| *C08G 63/183* | (2006.01) |
| *C08K 3/40* | (2006.01) |
| *C08K 5/103* | (2006.01) |
| *C08L 67/06* | (2006.01) |
| *C08L 69/00* | (2006.01) |

(52) U.S. Cl.
CPC ............ *C08L 67/02* (2013.01); *C08G 63/183* (2013.01); *C08G 63/85* (2013.01); *C08K 3/40* (2013.01); *C08K 5/103* (2013.01); *C08L 67/06* (2013.01); *C08L 69/00* (2013.01); *Y02P 20/582* (2015.11)

(58) Field of Classification Search
CPC .... C08L 69/00; C08L 69/005; C08L 2201/08; C08L 2314/08; C08L 2666/38; C08L 2666/78; C08K 5/005; C08K 5/36; C08G 63/82; C08G 63/85; C08G 63/87
USPC ........................................................ 523/523
See application file for complete search history.

(56) References Cited

U.S. PATENT DOCUMENTS 5,453,479 A * 9/1995 Borman ................. C08G 63/85
525/439
5,922,816 A * 7/1999 Hamilton ................ C08L 67/02
525/140

(Continued)

FOREIGN PATENT DOCUMENTS

WO WO 2011087141 A1 * 7/2011 ............. C08L 69/00

*Primary Examiner* — Jane L Stanley
(74) *Attorney, Agent, or Firm* — Honigman Miller Schwartz and Cohn LLP; Heidi M. Berven

(57) ABSTRACT

Disclosed is a process for the manufacture of a polyalkylene terephthalate such as polybutylene terephthalate. In particular, the process comprises employing a titanium-containing catalyst formed by the reaction product of tetraalkyl titanate and a complexing agent comprising a phosphorous, nitrogen or boron atom. The process is used to prepare polyalkylene terephthalates characterized by improved hydrostability, as well as compositions derived therefrom.

2 Claims, 1 Drawing Sheet

Related U.S. Application Data

(60) Provisional application No. 61/677,224, filed on Jul. 30, 2012.

(56) References Cited

U.S. PATENT DOCUMENTS

| | | | | |
|---|---|---|---|---|
| 6,762,235 B2 * | 7/2004 | Takenaka | ............ | C08G 63/183 524/494 |
| 2004/0254330 A1 * | 12/2004 | Duan | ................. | C08G 63/81 528/275 |
| 2007/0276069 A1 * | 11/2007 | Agarwal | ............. | C08L 67/02 524/394 |
| 2009/0005477 A1 * | 1/2009 | Yu | ..................... | C08L 69/00 524/114 |
| 2009/0209695 A1 * | 8/2009 | Yu | ..................... | C08L 67/02 524/451 |
| 2012/0289655 A1 * | 11/2012 | Sumita | ............... | B29C 45/0001 525/67 |

* cited by examiner

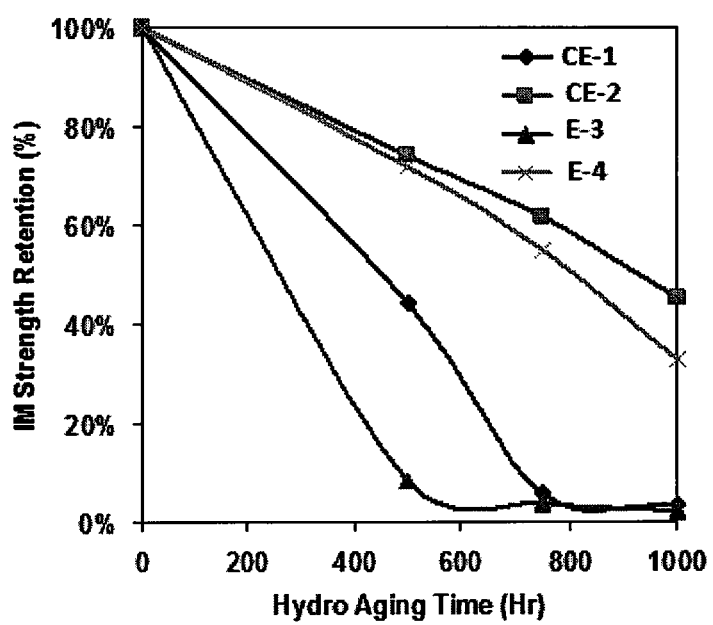

HYDROSTABILITY OF POLYCARBONATE POLYESTER COMPOSITION

CROSS REFERENCE TO RELATED APPLICATIONS

This application is a continuation application of U.S. Ser. No. 13/950,927, filed Jul. 25, 2013, which claims the benefit of U.S. Provisional application No. 61/677,224, filed Jul. 30, 2012, the entire contents of which are incorporated herein by reference.

TECHNICAL FIELD OF THE INVENTION

Disclosed is a process for the manufacture of a polyalkylene terephthalate such as polybutylene terephthalate. In particular, the process comprises employing a titanium-containing catalyst formed by the reaction product of tetraalkyl titanate and a complexing agent comprising a phosphorous, nitrogen or boron atom. The process is used to prepare polyalkylene terephthalates characterized by improved hydrostability, as well as compositions derived therefrom.

BACKGROUND OF THE INVENTION

Polybutylene terephthalate (PBT) resin is a well-known polyalkylene terephthalate that is semi-crystalline and has several desirable properties alone or in blends. Compared to amorphous resins such as acrylonitrile butadiene styrene (ABS), polycarbonate, and polystyrene, a semi-crystalline resin like PBT can show higher solvent resistance, strength, and stiffness due to the presence of crystalline spherulites in the resin. PBT resin is used in many applications in which its solvent resistance, strength, rigidity, and lubricity are needed, most commonly in durable goods that are formed by injection molding. Through its many blended products, PBT can be tailored to a wide variety of applications, including electronic and communications equipment, computers, televisions, kitchen and household appliances, industrial equipment, lighting systems, gardening and agricultural equipment, pumps, medical devices, food handling systems, handles, power and hand tools, bobbins and spindles, and automotive parts in both under-the-hood and exterior applications. Additionally, PBT is widely used to form electrical connectors.

It is generally known that PBT can be made by reacting 1,4-butanediol (BDO) with terephthalic acid (TPA) or dimethyl terephthalate (DMT) in the presence of a transesterification catalyst. U.S. Pat. Nos. 7,129,301; 6,020,393; 4,328,059, and US Patent Pub. 2005/0113534 A1 disclose various catalysts for the polymerization of polyesters.

Commonly used catalysts for the polymerization of PBT include tetraalkyl titanates. Among the various titanates are tetraisopropyl titanate, tetrabutyl titanate, and tetra(2-ethylhexyl) titanate. For example, JP 60147430 discloses a method of producing polyester by esterifying terephthalic acid, adipic acid and 1,4-butanediol in the presence of a titanium compound and a pentavalent phosphorus compound. U.S. Pat. No. 6,303,738 discloses a process for producing copolyester containing adipic acid in the presence of TYZOR® IAM (available from DuPont), which is prepared through the combination of tetraisopropyl titanate (TPT) and a mixture of butyl phosphate and dibutyl phosphate.

The catalyst used to prepare PBT is not typically quenched (deactivated) at the end of the polymerization process. Unfortunately, an active catalyst in the resin composition can sometimes lead to undesirable reactions in subsequent processing of the polyalkylene terephthalate. On exposure to high temperature and humidity, blends and compositions containing the polyalkylene terephthalate can exhibit hydrolytic degradation. Another problem associated with the presence of the active catalyst is transesterification, which can lead to loss of mechanical properties.

Catalyst quenchers such as phosphoric acid can be added to thermoplastic compositions to prevent such transesterification, but they can also promote degradation of polymer chains and contribute to a decrease in polymer molecular weight as well as greater hydrolytic instability. The use of phosphite stabilizers is less satisfactory because of the tendency for phosphites to be unstable to both hydrolysis and oxidation. Although the use of chain extenders can help to counterbalance the effect of the quencher, it is desirable to eliminate the use of either quencher or chain extender additives as a necessity.

Insufficient hydrostability of polyalkylene terephthalate can lead to chain cleavage, the extent of which depends on the exact conditions of exposure to water or humidity. Temperature, time of exposure, and pH are all important. Both acids and bases can catalyze ester hydrolysis. Decomposition of polyalkylene terephthalate can be accelerated in aqueous acid or base, or if the polymer matrix of polyalkylene terephthalate contains free acid or base additives. Since one of the reaction products of polyester hydrolysis is itself a carboxylic acid, the hydrolytic decomposition of PBT is autocatalytic, as depicted in Scheme 1.

Scheme 1

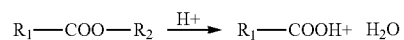

Thus, a need remains for new and improved catalysts or processes for the production of polyalkylene terephthalates that are effective in polymerization, but which do not adversely impact the properties of the resulting polyalkylene terephthalate. There is also a need to eliminate the necessity of using either quencher or chain extender additives in preparing polyalkylene terephthalates. There is a further need for polyalkylene terephthalates with improved properties including hydrostability as well as polymer compositions derived therefrom.

SUMMARY OF THE INVENTION

These and other needs are met by the present invention which is directed to polyalkylene terephthalates that are prepared by employing a polyesterification catalyst that comprises a complex that is the reaction product of a tetra($C_1$-$C_8$ alkyl) titanate and a compound selected from phosphorus-containing compounds, nitrogen-containing compounds, and boron-containing compounds. The catalyst can be synthesized in-situ, prior to ester interchange, for use during the ester interchange and polymerization stages of the manufacturing process. Surprisingly, although the catalyst is not separated from the polyalkylene terephthalates prior to isolation or further processing, it does not deleteriously affect the hydrostability or mechanical performance of the material.

The process of preparing a polyalkylene terephthalate comprises reacting an alkylene diol and a dicarboxy aromatic compound selected from the group consisting of aromatic dicarboxylic acids, aromatic dicarboxylic ($C_1$-$C_3$) alkyl esters, and combinations thereof, wherein the process comprises forming a catalyst which consists of the reaction product of a tetra($C_1$-$C_8$ alkyl) titanate such as tetraisopropyl titanate and a complexing agent. The complexing agent is selected from the group consisting of phosphorus-containing compounds, nitrogen-containing compounds, boron-containing compounds, and combinations thereof; obtaining ester interchange by combining the catalyst with the alkylene diol and the aromatic dicarboxy compound; and polymerizing the product of ester interchange, in the continued presence of the catalyst. The catalyst is formed in-situ prior to the ester interchange stage, specifically formed in a solution comprising the alkylene diol, shortly before the ester interchange takes place; i.e., before the alkylene diol and diacid are combined, specifically within 48 hours, more specifically within 24 hours, for example, within a time space of 12 hours or less.

This process solves the problem in the prior art regarding undesirable post-polymerization catalytic activity. In particular, as indicated above, the in-situ titanium-based catalyst system can improve hydrolytic stability, reduce or eliminate undesirable transesterification reactions during later processing, and thus improve mechanical performance. Furthermore, the catalyst system allows for the exclusion of catalyst quenchers in thermoplastic compositions containing the polyalkylene terephthalate resin. For example it is not necessary to add a catalyst quencher during compounding or compounding of additives prior to or during extrusion. As a result, because of the reduced amount or absence of catalyst quencher during blending or compounding of the polyalkylene terephthalate with other components, the resulting thermoplastic composition and articles made therefrom can show improved properties such as increased hydrolytic stability.

In one aspect, the invention is directed to a polyalkylene terephthalate with improved hydrostability, containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof. The tetra($C_1$-$C_8$ alkyl) titanate and phosphorous containing compound are both present during the process for making the polyalkylene terephthalate. Improved hydrostability is not observed in the polyalkylene terephthalate when the phosphorous containing compound is not resident with the tetra ($C_1$-$C_8$ alkyl) titanate.

In this aspect and the other aspects and embodiments of the invention, the polyalkylene terephthalate is prepared from "virgin" starting materials and not from recycled polyester such as polyethylene terephthalate. The virgin starting materials include alkylene diols and dicarboxy aromatic compounds selected from the group consisting of aromatic dicarboxylic acids, aromatic dicarboxylic ($C_1$-$C_3$) alkyl esters, and combinations thereof.

Thus, the polyalkylene terephthalate that is used in the present invention is not a "modified polyalkylene terephthalate." Modified polyalkylene terephthalate, which includes "modified PBT," is made from recycled or scrap polyethylene terephthalate (PET) wherein the polymer is modified by containing at least one residue derived from the polyethylene terephthalate component used in the process. The residue can be either incorporated into the structure of the polymer or present in admixture with the resin composition.

Thus, modified polyalkylene terephthalates can identifiably differ slightly from PBT that is not made from scrap PET ("virgin PBT") by such modifications which, however, can be controlled so that the modified PBT has desirable properties comparable or similar to virgin PBT with little or no adverse effects.

Modified polyalkylene terephthalate can generally be made by reacting alkylene diol such as 1,4-butanediol with PET particulates, for example flakes, in the presence of a transesterification catalyst, for instance, as disclosed in U.S. Pat. No. 7,902,263. In general, processes for preparing polyesters by depolymerizing aromatic polyesters in the presence of polyols are known in the art. For example, U.S. Pat. No. 5,451,611 describes a process for converting waste polyethylene terephthalate (PET) to either poly(ethylene-co-butylene terephthalate) or polybutylene terephthalate by reaction with butanediol. Example 11 of U.S. Pat. No. 5,451,611 patent shows a PBT polymer being formed with a complete replacement of ethylene glycol by butanediol. U.S. Pat. No. 5,266,601 and published U.S. Pat Application 20090275698 (A1) describe a process for making PBT from PET by reacting PET with butanediol.

In another aspect, the invention is directed to a hydrostable thermoplastic composition, comprising:

from 10 to 90 percent by weight of a polyalkylene terephthalate, wherein the polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 10 to 90 percent by weight of a polycarbonate;

wherein the polyalkylene terephthalate is not produced from recycled PET;

wherein all weight percents are based on the total weight of the composition; and wherein no quencher for the catalyst complex is added to the compounded thermoplastic composition.

In another aspect, the invention is directed to a hydrostable thermoplastic composition, comprising:

from 20 to 80 percent by weight of a polyalkylene terephthalate, wherein the polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 20 to 80 percent by weight of a polycarbonate from 0 to 30 percent by weight of an impact modifier or other polymer; and from 0 to 5 percent by weight of an additive selected from fillers the group consisting of reinforcing agents, anti-oxidants, heat stabilizers, light stabilizers, ultraviolet light (UV) absorbers, plasticizers, lubricants, mold release agents, anti-static agents, colorants, blowing agents, melt strength additives, flame retardants, and anti-drip agents, and combinations thereof; and wherein the polyalkylene terephthalate is not produced from recycled PET;

wherein all weight percents are based on the total weight of the composition; and wherein no quencher for the catalyst complex is added to the compounded thermoplastic composition.

These and other features, aspects, and advantages will become better understood with reference to the following description and appended claims.

BRIEF DESCRIPTION OF THE FIGURES

FIG. 1 shows impact strength retention as a function of hydro-aging time for a PBT-PC composition in which the PBT was prepared by the process described herein.

DETAILED DESCRIPTION OF THE INVENTION

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

Other than in the operating examples or where otherwise indicated, all numbers or expressions referring to quantities of ingredients, reaction conditions, and the like, used in the specification and claims are to be understood as in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group" and "isophthalic acid group" ("diacid groups") or "ethylene glycol group," "butanediol group," and "diethylene glycol group" ("diol groups) being used to indicate, for example, the weight percent (percent by weight) of the group in a molecule, the term "isophthalic acid group(s)" means the group or residue of isophthalic acid having the formula (—O(CO)C$_6$H$_4$(CO)—), the term "terephthalic acid group" means the group or residue of isophthalic acid having the formula (—O(CO)C$_6$H$_4$(CO)—), the term "diethylene glycol group" means the group or residue of diethylene glycol having the formula (—O(C$_2$H$_4$)O(C$_2$H$_4$)—), the term "butanediol group" means the group or residue of butanediol having the formula (—O(C$_4$H$_8$)—), and the term "ethylene glycol group" means the group or residue of ethylene glycol having the formula (—O(C$_2$H$_4$)—).

The term "recycle" as used herein refers to any component that has been manufactured and either used or intended for scrap. Thus, a recycled polyester can be polyester that has been used, for example in drinking bottle, or that is a byproduct of a manufacturing process, for example that does not meet a required specification and therefore would otherwise be discarded or scrapped. Recycle materials can therefore contain virgin materials that have not been utilized.

The prefix "bio-" or "bio-derived" as used herein means that the compound or composition is ultimately derived from a biomass or biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived polyethylene terephthalate is derived from reactants that are themselves derived from petroleum.

The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, as well as derivatives from these biomass examples. Examples of useful chemical substances include and are not limited to diols and monomers used to make diols. Biomass based butane diol can be obtained from several sources. For instance, the following process can be used to obtain biomass-based 1,4-butane diol. Agriculture based biomass, such as corn, can be converted into succinic acid by a fermentation process that also consumes carbon dioxide. Such succinic acid is commercially available from several sources such as from Diversified Natural Products Inc. under the trade name "BioAmber™". This succinic acid can be easily converted into 1,4-butane diol by processes described in several published documents such as in U.S. Pat. No. 4,096,156, incorporated herein in its entirety. Another process that describes converting succinic acid into 1,4-butane diol is described in Life Cycles Engineering Guidelines, by Smith et al., as described in EPA publication EPA/600/R-1/101 (2001).

The term "contain" as it refers to a polyalkylene terephthalate containing the catalyst described herein, means that the catalyst, which is synthesized in-situ, is present during formation of the terephthalate, so that the catalyst is present in the isolated polyalkylene terephthalate product.

In this application, parts per million (ppm) as relating, for instance, to ppm of tetra($C_1$-$C_8$ alkyl) titanate and ppm of a phosphorous containing compound in the polyalkylene terephthalate or compositions derived therefrom, is based on the total amount of titanium contained in the polyalkylene terephthalate.

In this application, the phrase "wherein essentially no quencher for the catalyst complex is added to the compounded thermoplastic composition" means that no quencher is added to the thermoplastic composition.

In the aspects and embodiments of the invention described herein, polyalkylene terephthalate is prepared from "virgin" starting material and not from recycled PET.

Unless otherwise specified, amounts are indicated in percents by weight.

Process

The invention described herein is based on the discovery that it is possible to produce polyalkylene terephthalate with improved hydrostability using a novel titanium-containing catalyst complex comprising the reaction product of a tetra ($C_1$-$C_8$ alkyl) titanate with a complexing agent selected from the group consisting of phosphorus-containing compounds, nitrogen-containing compounds, boron-containing compounds, and combinations thereof.

The process used to prepare polyalkylene terephthalate containing aromatic dicarboxylic acid groups incorporated into the polyester involves the reaction of a dicarboxy aromatic compound, for example an aromatic dicarboxylic acid, with an alkylene diol under conditions sufficient to form the polyester. Examples of the aromatic dicarboxylic acid group include isophthalic acid groups, terephthalic acid groups, and a combination thereof. The aromatic dicarboxylic group in the polyester can also be derived from corresponding di($C_1$ to $C_3$) alkyl esters. In a preferred embodiment, the aromatic dicarboxylic acid group is derived from terephthalic acid or di($C_1$-$C_3$)alkyl ester thereof.

The titanium catalyst comprises the reaction product of a tetra($C_1$-$C_8$ alkyl) titanate such as tetraisopropyl titanate and a complexing agent selected from:

(1) phosphorus-containing compounds, at a molar ratio of the phosphorus-containing compound:titanate from 0.05:1 to less than or equal to 1.2:1, specifically 0.2:1 to 1.2:1, more specifically 0.3:1 to 1.2:1, most specifically 0.5:1 to 1.2:1, (2) nitrogen-containing compounds, at a molar ratio of the nitrogen-containing compound:titanate from 0.05:1 to less than or equal to 2:1, specifically 0.2:1 to 1.2:1, more specifically 0.3:1 to 1.2:1, most specifically 0.5:1 to 1.2:1, (3) boron-containing compounds, at a molar ratio of the boron-containing compound:titanate from 0.05:1 to less than or equal to 2:1, specifically 0.2:1 to 1.2:1, more specifically 0.3:1 to 1.2:1, most specifically 0.5:1 to 1.2:1, and (4) combinations thereof.

Phosphorus-containing compounds can include, for example, phosphoric acid, poly(phosphoric acid), phosphorous acid, monobutyl phosphate, dibutyl phosphate, monoalkyl phosphates, dialkyl phosphates, and combinations thereof. Specifically, the phosphorous-containing compound can be a compound in which the phosphorus atom is bound to four oxygen atoms, more specifically a compound that is not a metallic salt. Thus, the catalyst can be the reaction product of a tetraalkyl titanate and a phosphorous-containing compound in which less than 50 mol %, specifically less than 25 mol %, more specifically essentially zero mol %, of the phosphorous-containing compound is associated with a metallic ion, specifically Li, Na, K, Ca, Mg, Ba, Zn, or mixtures thereof. More specifically, the phosphorous-containing compound comprises only one phosphorous atom per molecule. Thus, the formation of chelating ligands can be excluded in preparing the catalyst. In one embodiment, phosphonate and phosphonic acid compounds are excluded.

In particular, the present process can comprise forming a catalyst in situ by combining a tetra($C_1$-$C_8$ alkyl) titanate such as tetraisopropyl titanate with a complexing agent such as phosphoric acid and an alkylene diol, prior to transesterification and polymerization. By "in situ" is meant that the catalyst, a titanium complex, is not premade but is formed during the process in the presence of one or more components of the process. Thus, the catalyst is present during the transesterification and polymerization reactions.

In preparing the catalyst, the tetra($C_1$-$C_8$ alkyl) titanate, for reaction with the complexing agent, can be provided in a total amount of 25 to 1000 ppm, based on the total weight of the composition. The catalyst can be present in the process, during depolymerization and polymerization, in the amount of 10 to 1000 ppm, specifically 25 to 500 ppm, more specifically 35 to 250 ppm, most specifically 45 to 200 ppm, of titanium (Ti) based on the total weight of the composition (as well as based on the resulting solid product).

Nitrogen-containing compounds for forming the catalyst complex can include alkyl amines, aromatic amines, alkyl aromatic amines, alkanol amines, ammonium compounds, and combinations thereof.

Boron-containing compounds can include boric acid, boron alkoxides, boron oxides, boron halides, metaborates, monoalkyl borates, dialkyl borates, trialkyl borates, borazines, and combinations thereof.

In reference to the nitrogen-containing, phosphorous-containing, and boron-containing compounds, the term "alkyl" refers to branched or straight chain monovalent saturated groups comprising carbon and hydrogen, specifically having 1 to 12, more specifically 1 to 6, most specifically 1-3 carbon atoms. Specifically, alkanol can have an analogous number of carbon atoms. Aromatic compounds have at least one, specifically one, two or three $C_6$-$C_{12}$ aryl groups (for example phenyl, naphthyl, or the like) containing only carbon in the aromatic ring, optionally substituted. Exemplary substituents can include halogen, cyano, nitro, hydroxyl, alkyl, alkoxy, arylalkoxy, and combinations thereof.

In general, preparation of a polyalkylene terephthalate, specifically PBT, by melt-process polycondensation is well known to those skilled in the art. Conventional polycondensation procedures are described, for example, in U.S. Pat. No. 2,012,267. Such reactions are typically operated at temperatures from 150° C. to 300° C. in the presence of a catalyst employed in amounts between 10 to 1000 parts per million (ppm), based on total weight of the reactants. A branched polyalkylene terephthalate can be prepared in which a branching agent, for example, a glycol having three or more hydroxyl groups or a trifunctional or multifunctional carboxylic acid has been incorporated.

For example, conventional processes are known by which a poly(1,4-butylene terephthalate) or "PBT" resin can be obtained by polymerizing a glycol component at least 90 mol %, specifically at least 95 mol %, of which consists of tetramethylene glycol and an acid or ester component at least 90 mol %, specifically at least 95 mol %, of which consists of terephthalic acid. The present process can be used in cooperation with, or adapted to, methods (or elements of methods) available in the prior art, as will be appreciated by one of ordinary skill in the art.

As stated above, the present process of preparing a polyalkylene terephthalate can be by melt polycondensation comprising reacting an alkylene diol and a dicarboxy compound selected from the group consisting of an aromatic dicarboxylic acid, an aromatic dicarboxylic ($C_1$-$C_3$)alkyl ester, and combinations thereof, wherein ester interchange and polymerization occurs in the presence of a catalyst formed by reaction of a tetra($C_1$-$C_8$ alkyl) such as titanate tetraisopropyl titanate and a compound selected from phosphorus-containing compounds, nitrogen-containing compounds, boron-containing compounds, and combinations thereof, wherein the catalyst is synthesized in situ.

In particular, the present process can comprise forming the catalyst in situ by combining the tetra($C_1$-$C_8$ alkyl) titanate, complexing agent, and alkylene diol (prior to introduction of the aromatic dicarboxy compound) to form a first mixture, wherein the first mixture is subjected to heat at an elevated first temperature.

The aromatic dicarboxy compound can then be subsequently introduced, optionally with additional alkylene diol, into the first mixture to form a second mixture, which can be subjected to heat to obtain ester interchange at an elevated second temperature, specifically at a temperature that is higher than the first temperature. In one embodiment, the ester interchange is carried out until the production of methanol volatiles substantially ceases.

Polymerization can be initiated and carried out under vacuum, after substantial completion of the ester interchange, by further increasing the temperature to a third temperature higher than the second temperature. In particular, the second mixture can be subjected to vacuum, optionally with distillation, at a pressure of less than 2 Torr and a temperature of 220° C. to 270° C., to form molten polyalkylene terephthalate.

By way of illustration, a titanium-containing catalyst comprising the reaction product of tetra($C_1$-$C_8$alkyl) titanate such as tetraisopropyl titanate and a phosphorous-containing compound, for example, phosphoric acid, can be formed in situ as shown in Scheme 2.

recycled PET. Processes for recovering dimethyl terephthalate, also referred to as DMT or the dimethyl ester of terephthalic acid, are known in the art, for example as set forth in U.S. Pat. No. 6,472,557 and other patents disclosed therein, which disclosure is incorporated herein by reference. Typically, the polyethylene terephthalate is reacted at elevated temperature and suitable conditions with an alcohol, such as methanol, to break the ester linkages of the

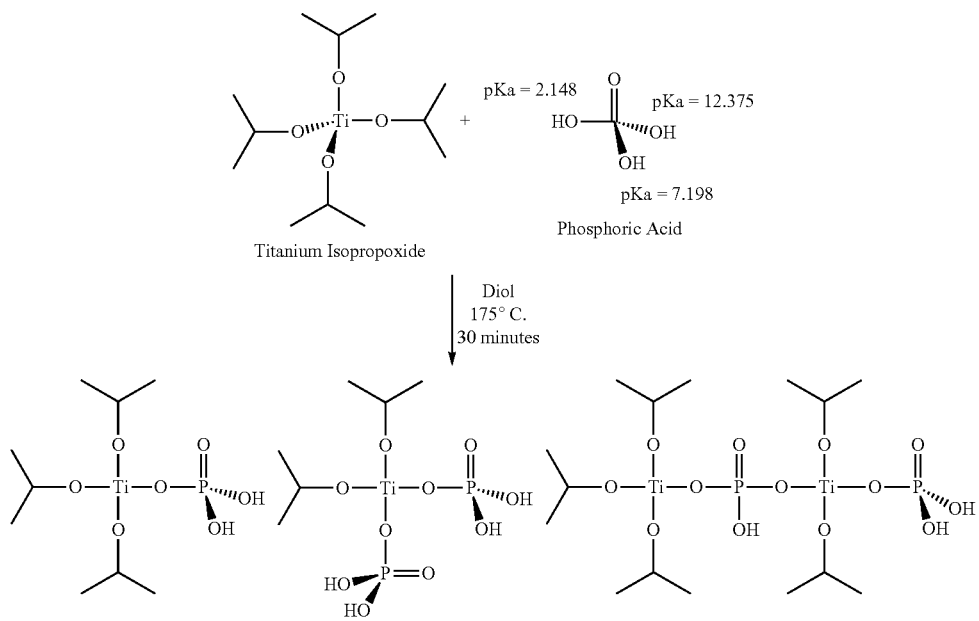

The in situ reaction between phosphoric acid and titanium isopropoxide (TPT) in diol solvent (for example, butanediol) can achieve a complete conversion in the reaction between the most acidic hydroxyl group of the phosphoric acid and TPT. Without wishing to be bound by theory, it is believed that once all strongly acidic hydroxyl groups are consumed, the ester interchange and polymerization (polyesterification or polycondensation) can be conducted without inhibition. After the catalyst preparation, all the monomer components can be introduced into the reactor, and the reaction temperature can be increased, for example to 220° C., to complete the ester interchange, followed by polycondensation, for example, at 250° C.

The alkylene diol groups incorporated into the polyalkylene terephthalate according to the present process can be derived from any alkylene diol, including cyclic and non-cyclic alkylene diols, that can react with the aromatic dicarboxy compound to form the polyalkylene terephthalate. Examples of suitable alkylene diols can include ethylene glycol, 1,2-propylene glycol, 1,3-propylene glycol, 1,2-butanediol, 2,3-butanediol, 1,4-butanediol, tetramethyl cyclobutanediol, cyclohexane dimethanol (including 1,2-, 1,3-, and 1,4-cyclohexane dimethanol), hexylene glycols, and combinations thereof. In one embodiment, the alkylene diol is selected from 1,4-butanediol, 1,3-propanediol, ethylene glycol, and combinations thereof. Any of the foregoing alkylene diols can be bio-derived from a biological source, for example, biomass.

The aromatic dicarboxy compound used in the present process can include dimethyl terephthalate derived from polyester and yield the corresponding diesters of the terephthalic acid, such as dimethyl terephthalate (DMT).

The present process excludes or limits the presence of aliphatic dicarboxylic acid monomers to form the polyalkylene terephthalate, which monomers comprise less than 5 wt. % of the polyalkylene terephthalate, specifically less than 2 wt. %, more specifically essentially zero wt. %. Thus, aliphatic dicarboxylic compounds having the general formula $(CH_2)_m(COOH)_2$, where m is an integer from 2 to 12, are excluded from use in preparing the polyalkylene terephthalate. Specifically, aliphatic dicarboxylic acids such as decanedioic acid, adipic acid, and sebacic acid are excluded or limited to insignificant amounts in the present process.

Examples of polyalkylene terephthalate that can be prepared by the present process include, for example, polyethylene terephthalate ("PET"), poly(1,4-butylene terephthalate) ("PBT"), polypropylene terephthalate ("PPT"), polycyclohexane terephthalate, copolyesters of terephthalate esters with comonomers containing cyclohexyl dimethanol and ethylene glycol, copolyesters of terephthalate acid with comonomers containing cyclohexyl dimethanol and ethylene glycol, polytrimethylene terephthalate, polydianol terephthalates, and combinations thereof.

The process can also be employed to prepare a polyalkylene terephthalate that is a copolyester derived from terephthalic acid (specifically terephthalic acid and/or isophthalic acid) and a mixture comprising a linear $C_{2-6}$ aliphatic diol (specifically ethylene glycol and butylene glycol); and a $C_{6-12}$ cycloaliphatic diol (specifically 1,4- cyclohexane diol, dimethanol decalin, dimethanol bicyclooctane, 1,4-cyclohexane dimethanol and its cis- and trans-isomers, 1,10-decane diol, and the like). The ester units comprising the two or more types of diols can be present in the polymer chain as individual units or as blocks of the same type of units. Specific esters of this type include poly(1,4-cyclohexylene dimethylene co-ethylene terephthalate) (PCTG) wherein greater than 50 mol % of the ester groups are derived from 1,4-cyclohexanedimethanol; and poly(ethylene-co-1,4-cyclohexylenedimethylene terephthalate) wherein greater than 50 mol % of the ester groups are derived from ethylene (PTCG). Thus, the term "alkylene diol" as used herein is meant to include both aliphatic and cycloaliphatic alcohols.

The process of preparing a polyalkylene terephthalate can comprise relatively lesser amounts of isophthalate groups and specifically less than 10 wt. %, more specifically less than 5 wt. %, most specifically less than 2 wt. % of acid groups other than terephthalate groups, isophthalate groups, and alkylene diol groups (cyclic alkylene diol groups and non-cyclic alkylene diol groups).

In one embodiment, the present process is used to prepare a polyalkylene terephthalate having a number average molecular weight of at least 15,000 g/mol, specifically 20,000 to 200,000 g/mol) and a polydispersity index from 2 to less than 6, specifically 2 to 5. In such an embodiment, the polyalkylene terephthalate, specifically the PBT, has a melting temperature ($T_m$) ranging from 150° C. to 223° C., specifically 200° C. to 218° C., more specifically 204° C. to 210° C. The molecular weight can be obtained using polystyrene standards, as measured by gel permeation chromatography in chloroform/hexafluoroisopropanol (5:95, volume/volume ratio) at 25° C.

The polyalkylene terephthalate can have an intrinsic viscosity (as measured in phenol/tetrachloroethane (60:40, volume/volume ratio) at 25° C.) of 0.4 to 2.0 deciliters per gram. In one embodiment, the PBT resin has an intrinsic viscosity of 0.6 to 1.4 dl/g.

The polyalkylene terephthalate prepared by the present process comprises the components of the titanium-containing catalyst. Thus, the polyalkylene terephthalate prepared by the present process comprises 50 to 300 ppm of tetra ($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof. More specifically, the polyalkylene terephthalate prepared by the present process is PBT, which comprises 50 to 300 ppm of tetraisopropyl titanate and 100 to 600 ppm of phosphoric acid.

In one embodiment, the present process is used to prepare a polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof. The polyalkylene terephthalate typically has a number average molecular weight of at least 15,000 g/mol, specifically 20,000 to 200,000 g/mol) and a polydispersity index from 2 to less than 6, specifically 2 to 5. In such an embodiment, the polyalkylene terephthalate, specifically the PBT, has a melting temperature ($T_m$) ranging from 150° C. to 223° C., specifically 200° C. to 218° C., more specifically 204° C. to 210° C. The molecular weight can be obtained using polystyrene standards, as measured by gel permeation chromatography in chloroform/hexafluoroisopropanol (5:95, volume/volume ratio) at 25° C.

In one embodiment, the polyalkylene terephthalate is polybutylene terephthalate which contains 50 to 300 ppm of tetra($C_1$-$C_8$ alkyl) titanate which is tetraisopropyl titanate and 100 to 600 ppm of a phosphorous containing compound which is phosphoric acid. The PBT typically has an intrinsic viscosity (as measured in phenol/tetrachloroethane (60:40, volume/volume ratio) at 25° C.) of 0.4 to 2.0 deciliters per gram. In one embodiment, the PBT resin has an intrinsic viscosity of 0.6 to 1.4 dl/g.

In another aspect, the invention is directed to a polyalkylene terephthalate prepared by a process comprising reacting a alkylene diol and a dicarboxy aromatic compound selected from the group consisting of aromatic dicarboxylic acids, aromatic dicarboxylic ($C_1$-$C_3$)alkyl esters, and combinations thereof, wherein the process comprises:

forming a catalyst that consists of the reaction product of tetra($C_1$-$C_8$ alkyl) titanate and a complexing agent selected from the group consisting of phosphorus-containing compounds, a nitrogen-containing compounds, a boron-containing compound, and combinations thereof;

obtaining ester interchange by combining the catalyst with the alkylene diol and the aromatic dicarboxy compound; and polymerizing the product of ester interchange, in the continued presence of the catalyst, yielding polyalkylene terephthalate.

Compositions

The polyalkylene terephthalate resin prepared by the process described herein can be blended with other components to obtain a thermoplastic blends. For example, a thermoplastic composition can include other polymers, in addition to the polyalkylene terephthalate prepared by the process disclosed herein. In particular, a polyalkylene terephthalate prepared by the process disclosed herein can be blended a polycarbonate.

Thus, in another embodiment, the invention is directed to a thermoplastic composition comprising:

from 10 to 90 percent by weight of a polyalkylene terephthalate, wherein the polyalkylene terephthalate 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and 10 to 90 percent by weight of a polycarbonate; and wherein no quencher for the catalyst complex is added to the compounded thermoplastic composition.

As used herein, the term "polycarbonate" means a composition having repeating structural carbonate units of the Formula (1):

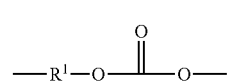

Formula 1 in which the $R^1$ groups are aromatic, aliphatic, or alicyclic organic radicals. In one embodiment, at least 60 percent of the total number of $R^1$ groups are aromatic organic radicals and the balance thereof are aliphatic, alicyclic, or aromatic radicals. In another embodiment, each $R^1$ is an aromatic organic radical, for example a radical of the Formula (2):

$$-A^1-Y^1-A^2 \qquad \text{Formula 2}$$

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene. In one specific embodiment, the polycarbonate is a linear homopolymer derived from bisphenol A, in which each of $A^1$ and $A^2$ is p-phenylene and $Y^1$ is isopropylidene.

Polycarbonates may be produced by the reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

$$HO-A^1-Y^1-A^2-OH \qquad \text{Formula 3}$$

wherein $Y^1$, $A^1$ and $A^2$ are as described above. Also included are bisphenol compounds of general formula (4):

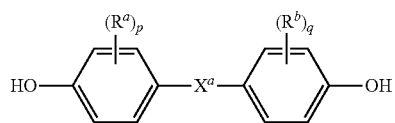

Formula 4 wherein $R^a$ and $R^b$ each represent a halogen atom or a monovalent hydrocarbon group and may be the same or different; p and q are each independently integers of 0 to 4; and $X^a$ represents one of the groups of formula (5):

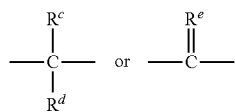

Formula 5 wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobi-indane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, and the like, as well as combinations comprising at least one of the foregoing dihydroxy compounds.

Specific examples of the types of bisphenol compounds that may be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, and 1,1-bis(4-hydroxy-t-butylphenyl)propane. Combinations comprising at least one of the foregoing dihydroxy compounds may also be used. The polycarbonate copolymers may be made by methods known in the art, such as by the method described in U.S. Application Publication 2003/0149223.

In some embodiments, blends of at least two different polycarbonates are used. In some of these embodiments, blends of at least two polycarbonates having different molecular weights are used. Branched polycarbonate are also useful as well as blends of a linear polycarbonate and a branched polycarbonate. The branched polycarbonates may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of 0.05 weight percent to 2.0 weight percent based on 100 percent by weight of the polycarbonate. All types of polycarbonate end groups are contemplated as being useful in the polycarbonate, provided that such end groups do not significantly affect desired properties of the thermoplastic compositions.

Polycarbonates as used herein further include blends of polycarbonates with other copolymers comprising carbonate chain units. A specific suitable copolymer is a "polyester carbonate", also known as a copolyester-polycarbonate. Such "polyester carbonate" copolymers further contain, in addition to recurring carbonate chain units of the formula (1), repeating units of formula (6)

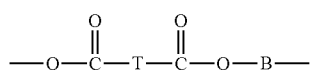

Formula 6 wherein B is a divalent radical derived from a dihydroxy compound, and may be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and may be, for example, a $C_{2-10}$ alkylene radical, a $C_{6-20}$ alicyclic radical, a $C_{6-20}$ alkyl aromatic radical, or a $C_{6-20}$ aromatic radical. As used herein, polyester carbonate means compositions having at least 5 mole percent of carbonate linkages relative to the molar sum of the carbonate and ester linkages.

In one embodiment, B is a $C_{2-6}$ alkylene radical. In another embodiment, B is derived from an aromatic dihydroxy compound of formula (7):

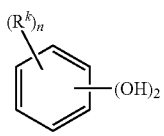

Formula 7 wherein each $R^k$ is independently a halogen atom, a $C_{1-10}$ hydrocarbon group, or a $C_{1-10}$ halogen substituted hydrocarbon group, and n is 0 to 4. The halogen is usually bromine. Examples of compounds that may be represented by the formula (7) include resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like; or combinations comprising at least one of the foregoing compounds.

Examples of aromatic dicarboxylic acid compounds that may be used to prepare the polyester carbonate include isophthalic or terephthalic acid, 1,2-di(p-carboxyphenyl) ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or mixtures thereof. A specific dicarboxylic acid comprises a mixture of isophthalic acid and terephthalic acid wherein the weight ratio of terephthalic acid to isophthalic acid is 10:1 to 0.2:9.8. In another specific embodiment, B is a $C_{2-6}$ alkylene radical and T is p-phenylene, m-phenylene, naphthalene, a divalent cycloaliphatic radical, or a mixture thereof. This class of polyester carbonate includes the poly (alkylene terephthalates). Suitable aliphatic dicarboxylic acids include succinic acid, oxalic acid, malonic acid, glutaric acid, adipic acid, pimelic acid, suberic acid, azelaic acid, sebacic acid, undecanoic diacid, dodecanoic diacid, maleic acid and fumaric acid. Rather than utilizing the dicarboxylic acid per se, it is possible, and sometimes even preferred, to employ the reactive derivatives of the acid, such as the corresponding acid halides, in particular the acid dichlorides and the acid dibromides in the interfacial polymerization method or esters such as optionally substituted phenyl esters in the melt polymerization method. Thus, for example, instead of using isophthalic acid, terephthalic acid, or mixtures thereof, it is possible to employ isophthaloyl dichloride, terephthaloyl dichloride, and mixtures thereof.

Suitable polycarbonates can be manufactured by processes such as interfacial polymerization or melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable carbonate precursors include, for example, a carbonyl halide such as carbonyl bromide or carbonyl chloride, or a haloformate such as a bishaloformate of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used.

Among the phase transfer catalysts that can be used are catalysts of the formula $(R^3)_4Q^+X$, wherein each $R^3$ is independently the same or different and is a $C_{1-10}$ alkyl group; Q is a nitrogen or phosphorus atom; and X is a halogen atom or a $C_{1-8}$ alkoxy group or $C_{6-18}$ aryloxy group. Exemplary phase transfer catalysts include, for example, $[CH_3(CH_2)_3]_4NX$, $[CH_3(CH_2)_3]_4X$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. An effective amount of a phase transfer catalyst can be 0.1 to 10 weight percent based on the weight of bisphenol in the phosgenation mixture. In another embodiment an effective amount of phase transfer catalyst can be 0.5 to 2 weight percent based on the weight of bisphenol in the phosgenation mixture. All types of polycarbonate end groups are contemplated as being useful in the thermoplastic composition, provided that such end groups do not significantly adversely affect desired properties of the compositions.

A chain stopper (also referred to as a capping agent) can be included during polymerization to form the polycarbonate. The chain stopper limits molecular weight growth rate, and so controls molecular weight in the polycarbonate. Exemplary chain stoppers include certain mono-phenolic compounds, mono-carboxylic acid chlorides, and/or mono-chloroformates. Mono-phenolic chain stoppers are exemplified by monocyclic phenols such as phenol and $C_{1-22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom can be specifically mentioned. Certain mono-phenolic UV absorbers can also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides can also be used as chain stoppers. These include monocyclic, mono-carboxylic acid chlorides such as benzoyl chloride, $C_{1-22}$ allyl-substituted benzoyl chloride, toluoyl chloride, halogen-substituted benzoyl chloride, bromobenzoyl chloride, cinnamoyl chloride, 4-nadimidobenzoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to 22 carbon atoms are useful. Functionalized chlorides of aliphatic monocarboxylic acids, such as acryloyl chloride and methacryloyl chloride, are also useful. Also useful are mono-chloroformates including monocyclic, mono-chloroformates, such as phenyl chloroformate, alkyl-substituted phenyl chloroformate, p-cumyl phenyl chloroformate, toluene chloroformate, and combinations thereof.

Alternatively, melt processes may be used to make the polycarbonate. Generally, in the melt polymerization process, polycarbonates may be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

Blends and/or mixtures of more than one polycarbonate may also be used. For example, a high flow and a low flow polycarbonate may be blended together. In one embodiment, a blend and/or mixture of linear polycarbonates having a weight average molecular weight relative to polycarbonate standards of less than 31,000 Daltons, specifically between 18,000 and 31,000 Daltons, is used.

In one embodiment, the polycarbonate is a 2,2-bis(4-hydroxyphenyl)propane (bisphenol-A) polycarbonate, commercially available under the trade designation LEXAN.

In another embodiment, the polycarbonate can be a polycarbonate-siloxane copolymer. The polydiorganosiloxane blocks comprise repeating structural units of the formula (sometimes referred to herein as "siloxane"):

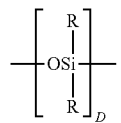

wherein each occurrence of R is same or different, and is a $C_{1-13}$ monovalent organic radical. For example, R may be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-10}$ aryl group, $C_{6-10}$ aryloxy group, $C_{7-13}$ aralkyl group, $C_{7-13}$ aralkoxy group, $C_{7-13}$ alkaryl group, or $C_{7-13}$ alkaryloxy group. Combinations of the foregoing R groups may be used in the same copolymer.

The value of D in

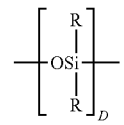

may vary widely depending on the type and relative amount of each component in the thermoplastic composition, the desired properties of the composition, and like considerations. Generally, D may have an average value of 2 to about 1000, specifically about 2 to about 500, more specifically about 5 to about 100. In one embodiment, D has an average value of about 10 to about 75, and in still another embodiment, D has an average value of about 40 to about 60. Where D is of a lower value, e.g., less than about 40, it may be desirable to use a relatively larger amount of the polycarbonate-polysiloxane copolymer. Conversely, where D is of a higher value, e.g., greater than about 40, it may be necessary to use a relatively lower amount of the polycarbonate-polysiloxane copolymer.

A combination of a first and a second (or more) polycarbonate-polysiloxane copolymers may be used, wherein the average value of D of the first copolymer is less than the average value of D of the second copolymer.

In one embodiment, the polydiorganosiloxane blocks are provided by repeating structural units of the formula:

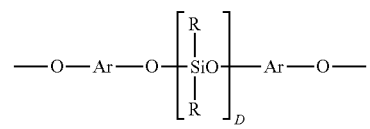

wherein D is as defined above; each R may be the same or different, and is as defined above; and Ar may be the same or different, and is a substituted or unsubstituted $C_{6-30}$ arylene radical, wherein the bonds are directly connected to an aromatic moiety. Suitable Ar groups in this formula may be derived from a $C_{6-30}$ dihydroxyarylene compound, for example a dihydroxyarylene compound of formula HO-$A^1$-$Y^1$-$A^2$-OH,

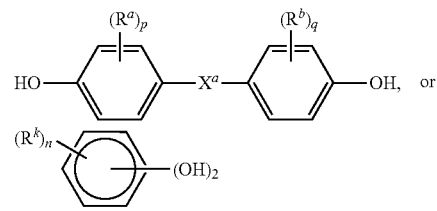

above. Combinations comprising at least one of the foregoing dihydroxyarylene compounds may also be used. Specific examples of suitable dihydroxyarlyene compounds are 1,1-bis(4-hydroxyphenyl)methane, 1,1-bis(4-hydroxyphenyl) ethane, 2,2-bis(4-hydroxyphenyl) propane, 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxyphenyl)cyclohexane, bis(4-hydroxyphenyl sulphide), and 1,1-bis(4-hydroxy-t-butylphenyl) propane. Combinations comprising at least one of the foregoing dihydroxy compounds may also be used.

Such units may be derived from the corresponding dihydroxy compound of the following formula:

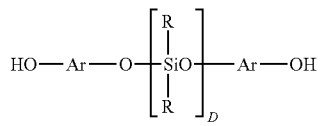

wherein Ar and D are as described above. Such compounds are further described in U.S. Pat. No. 4,746,701 to Kress et al. Compounds of this formula may be obtained by the reaction of a dihydroxyarylene compound with, for example, an alpha,omega-bisacetoxypolydiorangonosiloxane under phase transfer conditions.

In another embodiment the polydiorganosiloxane blocks comprise repeating structural units of the formula:

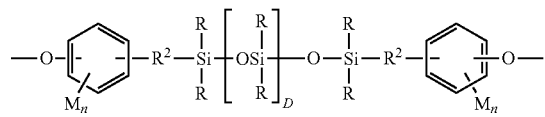

wherein R and D are as defined above. $R^2$ in this formula is a divalent $C_{2-8}$ aliphatic group. Each M in this formula may be the same or different, and may be a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ aralkyl, $C_{7-12}$ aralkoxy, $C_{7-12}$ alkaryl, or $C_{7-12}$ alkaryloxy, wherein each n is independently 0, 1, 2, 3, or 4.

In one embodiment, M is an alkyl group such as methyl, ethyl, or propyl, an alkoxy group such as methoxy, ethoxy, or propoxy, or an aryl group such as phenyl or tolyl; $R^2$ is a dimethylene, trimethylene or tetramethylene group; and R is a $C_{1-8}$ alkyl, cyanoalkyl, or aryl such as phenyl, or tolyl. In another embodiment, R is methyl or a mixture of methyl and phenyl. In still another embodiment, M is methoxy, n is one, $R^2$ is a divalent $C_{1-3}$ aliphatic group, and R is methyl.

These units may be derived from the corresponding dihydroxy polydiorganosiloxane:

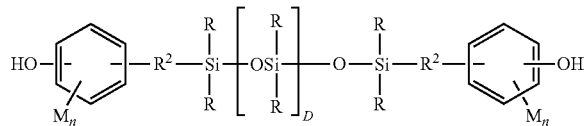

wherein R, D, M, $R^2$, and n are as described above.

Such dihydroxy polysiloxanes can be made by effecting a platinum catalyzed addition between a siloxane hydride of the formula:

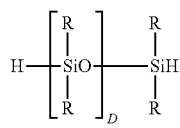

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing may also be used.

A polycarbonate-polysiloxane copolymer may be manufactured by reaction of diphenolic polysiloxane with a carbonate source and a dihydroxy aromatic compound, optionally in the presence of a phase transfer catalyst as described above. Suitable conditions are similar to those useful in forming polycarbonates. For example, the copolymers are prepared by phosgenation, at temperatures from below 0° C. to about 100° C., desirably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above. Siloxane groups may also be present at or attached to the ends of the copolymer as well.

In the production of a polycarbonate-polysiloxane copolymer, the amount of dihydroxy polydiorganosiloxane is selected so as to provide the desired amount of polydiorganosiloxane units in the copolymer. The amount of polydiorganosiloxane units may vary widely, i.e., may be about 1 wt % to about 99 wt % of polydimethylsiloxane, or an equivalent molar amount of another polydiorganosiloxane, with the balance being carbonate units. The particular amounts used will therefore be determined depending on desired physical properties of the thermoplastic composition, the value of D (within the range of 2 to about 1000), and the type and relative amount of each component in the thermoplastic composition, including the type and amount of polycarbonate, type and amount of impact modifier, type and amount of polycarbonate-polysiloxane copolymer, and type and amount of any other additives. Suitable amounts of dihydroxy polydiorganosiloxane can be determined by one of ordinary skill in the art without undue experimentation using the guidelines taught herein. For example, the amount of dihydroxy polydiorganosiloxane may be selected so as to produce a copolymer comprising about 1 wt % to about 75 wt %, or about 1 wt % to about 50 wt % polydimethylsiloxane, or an equivalent molar amount of another polydiorganosiloxane. In one embodiment, the copolymer comprises about 5 wt % to about 40 wt %, optionally about 5 wt % to about 25 wt % polydimethylsiloxane, or an equivalent molar amount of another polydiorganosiloxane, with the balance being polycarbonate. In a particular embodiment, the copolymer may comprise about 20 wt % siloxane.

In specific embodiments, the polycarbonate is derived from a dihydroxy compound having the structure of the Formula:

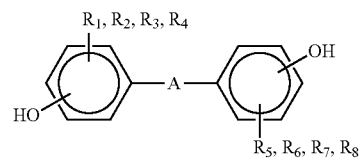

wherein R₁ through R₈ are each independently selected from hydrogen, halogen, nitro, cyano, $C_{1-20}$ alkyl, $C_{4-20}$ cycloalkyl, and $C_{6-20}$ aryl; and A is selected from a bond, —O—, —S—, —SO₂, $C_{1-12}$ alkyl, $C_{6-20}$ aromatic, and $C_{6-20}$ cycloaliphatic.

In specific embodiments, the dihydroxy compound of Formula (I) is 2,2-bis(4-hydroxyphenyl) propane (i.e. bisphenol-A or BPA). Other illustrative compounds of Formula (I) include: 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxyphenyl)cyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

The polyorganosiloxane-polycarbonate can comprise 50 to 99 wt. % of carbonate units and 1 to 50 wt. % siloxane units. Within this range, the polyorganosiloxane-polycarbonate copolymer can comprise 70 to 98 wt. %, more specifically 75 to 97 wt. % of carbonate units and 2 to 30 wt. %, more specifically 3 to 25 wt. % siloxane units.

Polyorganosiloxane-polycarbonates can have a weight average molecular weight of 2,000 to 100,000 Daltons, specifically 5,000 to 50,000 Daltons as measured by gel permeation chromatography using a crosslinked styrene-divinyl benzene column, at a sample concentration of 1 milligram per milliliter, and as calibrated with polycarbonate standards.

The polyorganosiloxane-polycarbonate can have a melt volume flow rate, measured at 300° C./1.2 kg, of 1 to 50 cubic centimeters per 10 minutes (cc/10 min), specifically 2 to 30 cc/10 min. Mixtures of polyorganosiloxane-polycarbonates of different flow properties can be used to achieve the overall desired flow property.

In one embodiment, Polycarbonate B is Polycarbonate-Polydimethylsiloxane copolymer containing approximately 18 to 20 percent siloxane. The polycarbonate-polysiloxane copolymer has a weight average molecular weight of 28,000 to 32,000.

Specifically, the polycarbonate-siloxane block copolymer can have the following formula:

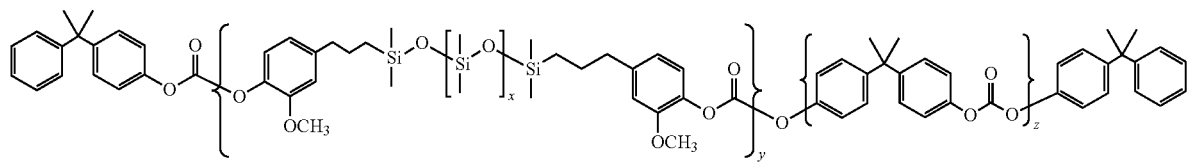

wherein x is 30-50, specifically about 40, y is 10-30, specifically about 20, and z is 45-60, specifically about 50 or 55.

In one embodiment, the thermoplastic composition comprises about 10 to 90 percent of the polycarbonate. In another embodiment, the thermoplastic composition comprises about 20 to 80 percent of the polycarbonate. In another embodiment, the thermoplastic composition comprises about 30 to 70 percent of the polycarbonate. In another embodiment, the thermoplastic composition comprises about 40-60 percent of the polycarbonate. Specifically, the polycarbonate is a bisphenol polycarbonate or mixture of polycarbonates.

Thus, in a specific embodiment, the thermoplastic composition comprises:

from 20 to 80 percent by weight of a PBT prepared as described herein, wherein the polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 20 to 80 percent by weight of a bisphenol polycarbonate or mixture of polycarbonates.

Thus, in a specific embodiment, the thermoplastic composition comprises:

from 30 to 70 percent by weight of a PBT prepared as described herein, wherein the polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 30 to 70 percent by weight of a bisphenol polycarbonate or mixture of polycarbonates.

In another specific embodiment, the thermoplastic composition comprises:

from 20 to 80 percent by weight of a PBT prepared as described herein, wherein the polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 20 to 80 percent by weight of a bisphenol polycarbonate or mixture of polycarbonates;

from 0 to 30 percent by weight of an impact modifier or other polymer; and from 0 to 5 percent by weight of an additive selected from fillers the group consisting of reinforcing agents, anti-oxidants, heat stabilizers, light stabilizers, ultraviolet light (UV) absorbers, plasticizers, lubricants, mold release agents, antistatic agents, colorants, blowing agents, melt strength additives, flame retardants, and anti-drip agents, and combinations thereof; and wherein the polyalkylene terephthalate is not produced from recycled PET;

wherein all weight percents are based on the total weight of the composition; and wherein no quencher for the catalyst complex is added to the compounded thermoplastic composition.

In another specific embodiment, the thermoplastic composition comprises:

from 20 to 50 percent by weight of a PBT prepared as described herein, wherein the polyalkylene terephthalate contains 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof; and from 20 to 80 percent by weight of a bisphenol polycarbonate or mixture of polycarbonates;

from 0 to 30 percent by weight of an impact modifier or other polymer; and from 0 to 5 percent by weight of an additive selected from fillers the group consisting of reinforcing agents, anti-oxidants, heat stabilizers, light stabilizers, ultraviolet light (UV) absorbers, plasticizers, lubricants, mold release agents, antistatic agents, colorants, blowing agents, melt strength additives, flame retardants, and anti-drip agents, and combinations thereof; and wherein the polyalkylene terephthalate is not produced from recycled PET;

wherein all weight percents are based on the total weight of the composition; and wherein no quencher for the catalyst complex is added to the compounded thermoplastic composition.

As indicated by the previous embodiment, other additives can be added to the polyalkylene terephthalate-polycarbonate thermoplastic blends for the purpose of imparting properties desirable in the product being made. Additives are ordinarily incorporated into polymer compositions with the proviso that the additives are selected so as to not significantly adversely affect the desired properties of the composition, for example, impact, flexural strength, color, and the like. Such additives can be mixed at a suitable time during the mixing of the components for forming the composition. Possible additives include impact modifiers, fillers, reinforcing agents, anti-oxidants, heat stabilizers, light stabilizers, ultraviolet light (UV) absorbers, plasticizers, lubricants, mold release agents, antistatic agents, colorants, blowing agents, melt strength additives, flame retardants, and anti-drip agents. A good source for information relating to additives is the *Plastics Additives Handbook*, 6$^{th}$ ed. (Hans Zweifel, Ed., 2009).

Combinations of additives can be used, for example, an antioxidant, a UV absorber, and a mold release agent. The total amount of additives (other than any impact modifier, filler, or reinforcing agents) is generally 0.01 to 15 percent by weight, based on the total weight of the composition.

Thus, in another embodiment, in addition to a polyalkylene terephthalate prepared as described herein and a polycarbonate, the thermoplastic composition further comprises an impact modifier. Many impact modifiers are known and are commercially available. Such impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of such impact modifiers can be used.

An example of specific type of impact modifier is an elastomer-modified graft copolymer comprising (i) an elastomeric (i.e., rubbery) polymer substrate having a Tg less than about 10° C., more specifically less than about −10° C., or more specifically about −40° to −80° C., and (ii) a rigid polymeric superstate grafted to the elastomeric polymer substrate. Materials suitable for use as the elastomeric phase include, for example, conjugated diene rubbers, for example polybutadiene and polyisoprene; copolymers of a conjugated diene with less than about 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl(meth)acrylates; elastomeric copolymers of $C_{1-8}$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

Other impact modifiers include an epoxy-functional copolymer comprising units derived from a $C_2$-$C_{20}$ olefin and units derived from a glycidyl(meth)acrylate. Exemplary olefins include ethylene, propylene, butylene, and the like. The olefin units can be present in the copolymer in the form of blocks, e.g., as polyethylene, polypropylene, polybutylene, and the like blocks. It is also possible to use mixtures of olefins, i.e., blocks containing a mixture of ethylene and propylene units, or blocks of polyethylene together with blocks of polypropylene.

In addition to glycidyl(meth)acrylate units, the copolymers can further comprise additional units, for example $C_1$-$C_4$ alkyl(meth)acrylate units. In one embodiment, the impact modifier is terpolymeric, comprising polyethylene blocks, methyl acrylate blocks, and glycidyl methacrylate blocks. Specific impact modifiers are a co- or ter-polymer including units of ethylene, glycidyl methacrylate (GMA), and methyl acrylate, available under the trade name LOTADER® polymer, sold by Arkema. The terpolymers comprise, based on the total weight of the copolymer, 0.3 to 12 wt. % of glycidyl methacrylate units, more specifically 0.4 to 11 wt. % of glycidyl methacrylate units, even more specifically 0.5 to 10 wt. % of glycidyl methacrylate units. Suitable impact modifiers include the ethylene-methyl acrylate-glycidyl methacrylate terpolymer comprising 8 wt. % glycidyl methacrylate units available under the trade name LOTADER AX8900.

Specifically, such impact modifiers include methyl meth (acrylate)-butadiene-styrene, acrylonitrile-butadiene-styrene, styrene-ethylene/butylene-styrene, ethylene-glycidyl methacrylate-methyl acrylate, ethylene-glycidyl(meth)acrylate-methyl acrylate impact modifier, and combinations thereof.

In one embodiment, the thermoplastic composition comprises 0.01 to 20 percent by weight of an impact modifier. More particularly, about 1 to 20 percent by weight of the impact modifier is present in the thermoplastic composition of the invention. More particularly, about 5 to 15 percent by weight of the impact modifier is present in the thermoplastic composition of the invention. In a particular embodiment, the impact modifier is a methylmethacrylate butadiene styrene (MBS) used alone or with linear low density polyethylene (LLDPE).

In addition to the PBT prepared by the process disclosed herein, the polycarbonate, and the impact modifier, the thermoplastic composition contains a stabilizer. The stabilizer can be a mixture of stabilizers, such as anti-oxidants, heat stabilizers, light stabilizers, or ultraviolet light (UV) absorbers. Many impact modifiers are known and are commercially available. The total amount of stabilizer used is typically from 0.01 to 5 percent by weight, and more particularly from 0.01 to 3 percent by weight. In a particular embodiment, pentaerythritol betalaurylthiopropionate and one or more additional stabilizers is present in the thermoplastic composition. In a further embodiment, the additional stabilizer is pentaerythritol-tetrakis(3-(3,5-di-tert-butyl-4-hydroxy-phenyl-)propionate). In a particular embodiment, 0.01 to 1 percent by weight of pentaerythritol betalaurylthiopropionate is present in the composition and 0.01 to 1 percent by weight of the pentaerythritol-tetrakis(3-(3,5-di-tert-butyl-4-hydroxy-phenyl-) propionate). In a more particular embodiment, 0.01 to 0.1 percent by weight of pentaerythritol betalaurylthiopropionate is present in the composition and 0.01 to 0.1 percent by weight of the pentaerythritol-tetrakis(3-(3,5-di-tert-butyl-4-hydroxy-phenyl-)propionate).

In addition to the above-described additives, used accessorily in a small amount, depending on the object, other polymers or resins, typically in an amount less than 50 weight percent, specifically less than 30 percent by weight, more specifically less that 20 percent by weight, of the total composition, can be added to the thermoplastic resin composition containing the polyethylene terephthalate. For example, such additional polymers can include polyamides, polyphenylene sulfide, polyphenylene oxide, polyacetal, acrylonitrile-styrene resin, acrylonitrile-butadiene-styrene resin, polysulfone, polyesteramides, polyether sulfone, polyether imide, polyether ketone, fluorine resin, and combinations thereof.

In addition to polyalkylene terephthalate and polycarbonate, other polyesters can optionally be present in the composition (in an amount of less than 50 weight percent, specifically less than 30 percent by weight, more specifically less that 20 percent by weight, most specifically less than 10 percent by weight of the total composition, provided that such polyesters do not significantly and adversely affect the desired properties of the composition.

For example, a thermoplastic composition can include, in addition to the polyethylene terephthalate prepared by the present process other aromatic polyesters, cycloaliphatic polyesters, and the like. The additional polyesters can be virgin polyesters or wholly or partially bio-derived, including petroleum-derived aromatic polyesters and bio-derived aromatic polyesters.

The thermoplastic composition prepared as described herein is characterized by the intentional exclusion of a catalyst quencher such as an acid interchange quencher from the composition. Thus, a process according to the present invention can be further characterized by excluding (not adding) a catalyst quencher as a means for quenching the catalyst in the thermoplastic composition containing the polyalkylene terephthalate resin composition.

As indicated previously, quenchers are agents that inhibit activity of any catalysts that can be present in the thermoplastic composition, in order to prevent an accelerated interpolymerization and degradation of the polymer in the thermoplastic composition. Such quenchers are selected from the group consisting of acidic phosphate salts, acid phosphites, alkyl phosphites, aryl phosphites, mixed phosphites and combinations thereof, specifically acidic phosphate salts; acid phosphites, alkyl phosphites, aryl phosphites or mixed phosphites having at least one acidic hydrogen; a Group IB or Group IIB metal phosphate salt; a phosphorus oxo acid, a metal acid pyrophosphate or a mixture thereof. The acidic phosphate salts can include sodium dihydrogen phosphate, mono zinc phosphate, potassium hydrogen phosphate, calcium dihydrogen phosphate and the like. Specific quenchers are phosphoric acid, phosphorous acid or their partial esters such as mono zinc phosphate. More specifically, quenchers can include zinc phosphate, monozinc phosphate, phosphorous acid, phosphoric acid diluted in water, sodium acid pyrophosphate, tetrapropylorthosilicate, tetrakis-(2-methoxyethoxy)silane), sodium lauryl sulphate, boric acid, citric acid, oxalic acid, a cyclic iminoether containing compound, and combinations thereof In one embodiment, the thermoplastic composition, comprises from 30 to 70 percent by weight of a polyalkylene terephthalate, wherein the polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;

from 30 to 70 percent by weight of a polycarbonate; and from 0.01 to 20 percent by weight of an impact modifier; and wherein no quencher for the catalyst complex is added to the compounded thermoplastic composition.

In another embodiment, the thermoplastic composition, comprises:

from 25 to 50 percent by weight of a polyalkylene terephthalate, wherein the polyalkylene terephthalate containing 50 to 300 ppm of tetra($C_1$-$C_8$ alkyl) titanate and 100 to 600 ppm of a phosphorous containing compound, both based on the total amount of titanium present, wherein the phosphorous containing compound is selected from the group consisting of phosphoric acid, poly(phosphoric acid), phosphorus acid, monobutyl phosphate, dibutyl phosphate, monoalkyl phosphates, dialkyl phosphates, and combinations thereof;

from 40 to 60 percent by weight of a polycarbonate;

from 1 to 20 percent by weight of an impact modifier; and from 0.01 to 5 percent by weight of a stabilizer;

wherein no quencher for the catalyst complex is added to the compounded thermoplastic composition.

In another embodiment, the thermoplastic composition, comprises:

from 25 to 35 percent by weight of a polybutylene terephthalate, wherein the polybutylene terephthalate contains 50 to 300 ppm of tetraisopropyl titanate and 100 to 600 ppm of phosphoric acid;

from 40 to 60 percent by weight of a bisphenol A polycarbonate;

from 1 to 20 percent by weight of an impact modifier comprising MBS alone or with LLDPE; and from 0.01 to 3 percent by weight of a stabilizer;

wherein no quencher for the catalyst complex is added to the compounded thermoplastic composition.

In another embodiment, the invention is directed to a hydrostable thermoplastic composition, comprising:

from 25 to 35 percent by weight of a polyalkylene terephthalate, wherein the polyalkylene terephthalate contains 50 to 300 ppm of tetra($C_1$-$C_8$ alkyl) titanate and 100 to 600 ppm of a phosphorous containing compound selected from the group consisting of phosphoric acid, poly(phosphoric acid), phosphorus acid, monobutyl phosphate, dibutyl phosphate, monoalkyl phosphates, dialkyl phosphates, and combinations thereof; and from 40 to 60 percent by weight of a polycarbonate from 5 to 15 percent by weight of an impact modifier or other polymer; and from 0.01 to 0.1 percent by weight of pentaerythritol betalaurylthiopropionate;

and 0.01 to 0.1 percent by weight of the pentaerythritol-tetrakis(3-(3,5-di-tert-butyl-4-hydroxy-phenyl-)propionate); and wherein no quencher for the catalyst complex is added to the compounded thermoplastic composition.

In another embodiment, the invention is directed to a hydrostable thermoplastic composition, comprising:

from 25 to 35 percent by weight of a polyalkylene terephthalate, wherein the polyalkylene terephthalate contains 50 to 300 ppm of tetra($C_1$-$C_8$ alkyl) titanate and 100 to 600 ppm of a phosphorous containing compound selected from the group consisting of phosphoric acid, poly(phosphoric acid), phosphorus acid, monobutyl phosphate, dibutyl phosphate, monoalkyl phosphates, dialkyl phosphates, and combinations thereof; and from 40 to 60 percent by weight of a polycarbonate from 5 to 15 percent by weight of an impact modifier or other polymer; and from 0.01 to 3 percent by weight of an additive selected from a nucleating agent, antioxidant, UV stabilizer, plasticizer, epoxy compound, melt strength additive, or a combination thereof, crosslinkers, and combinations thereof; and wherein no quencher for the catalyst complex is added to the compounded thermoplastic composition.

A thermoplastic composition comprising the polyalkylene terephthalate as described herein can be prepared by blending the components of the thermoplastic composition employing a number of procedures. In an exemplary process, the thermoplastic composition comprising a polyalkylene terephthalate prepared according to the present process, an optional reinforcing filler, and any optional other polymers or additives are placed into an extrusion compounder to produce molding pellets. The components are dispersed in a matrix in the process. In another procedure, the components and reinforcing filler are mixed by dry blending, and then fluxed on a mill and comminuted, or extruded and chopped. The thermoplastic composition can also be mixed and directly molded, e.g., by injection or transfer molding techniques. Specifically, all of the components are freed from as much water as possible. In addition, compounding is carried out to ensure that the residence time in the machine is short; the temperature is carefully controlled; the friction heat is utilized; and an intimate blend between the components is obtained.

The components of the thermoplastic composition can be pre-compounded, pelletized, and then molded. Pre-compounding can be carried out in conventional equipment. For example, after pre-drying the polyester composition (e.g., for four hours at 120° C.), a single screw extruder can be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) can be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions capable of insert molding.

Thus, in another aspect, the invention is directed to a process for forming a thermoplastic composition by blending, based on the total weight of the thermoplastic composition, the following:

from 25 to 35 percent by weight of a polyalkylene terephthalate, wherein the polyalkylene terephthalate contains 50 to 300 ppm of tetra($C_1$-$C_5$ alkyl) titanate and 100 to 600 ppm of a phosphorous containing compound selected from the group consisting of phosphoric acid, poly(phosphoric acid), phosphorus acid, monobutyl phosphate, dibutyl phosphate, monoalkyl phosphates, dialkyl phosphates, and combinations thereof; and 40 to 60 percent by weight of a polycarbonate from 0.01 to 20 percent by weight of an impact modifier or other polymer; and from 0.01 to 5 percent by weight of an additive selected from a nucleating agent, antioxidant, UV stabilizer, plasticizer, epoxy compound, melt strength additive, or a combination thereof, crosslinkers, and combinations thereof; wherein no quencher for the catalyst complex is added to the compounded thermoplastic composition; and extruding, calendaring, extrusion molding, blow molding, solvent casting, or injection molding the thermoplastic composition.

Advantageously, useful articles can be made from the polyalkylene terephthalate made according to the process described herein or thermoplastic compositions comprising the polyalkylene terephthalate. In a specific embodiment, an article is extruded, calendared, or molded, for example blow molded or injection molded from the polyalkylene terephthalate or composition containing the polymer. The article can be a film or a sheet. When the article is a film, the article can be formed by extrusion molding or calendaring the polyalkylene terephthalate or thermoplastic composition containing the polyester.

The thermoplastic compositions made from the present process provide product lines that have superior hydrolytic stability. In particular, such thermoplastic compositions can provide improved hydro and heat resistance in abusive molding and outdoor application.

As stated above, various combinations of the foregoing embodiments can be used.

The invention is further described in the following illustrative examples in which all parts and percentages are by weight unless otherwise indicated.

Examples

The following examples illustrate the scope of the invention. The examples and preparations which follow are provided to enable those skilled in the art to more clearly understand and to practice the present invention. They should not be considered as limiting the scope of the invention, but merely as being illustrative and representative thereof. The examples are annotated as "E." and comparative examples are annotated hereinafter as "CE", employed the materials listed in Table 1.

TABLE 1

| Component | Trade Name and Supplier |
|---|---|
| BDO | 1,4-Butanediol, CAS Reg. No. 110-6304, from BASF. |
| PA | Phosphoric Acid CAS Reg. No. 7664-38-2, from Acros. |
| TPT | Tetraisopropyl titanate, CAS Reg. No. 546-68-9, from DuPont, commercial Tyzor grade |
| DMT | Dimethyl Terephthlate, CAS Reg. No. 120-61-6., from Invista |
| PE-I | Polybutylene Terephthalate (PBT) sold by SABIC Innovative Plastics as VALOX ® 315 with an intrinsic viscosity of 1.2 cm$^3$/g as measured in a 60:40 phenol/tetrachloroethane. |
| PE-II | PBT prepared by the process disclosed in Part B, below |
| Poly-carbonate 1 | Bisphenol A polycarbonate resin, CAS Reg. No. 25971-63-5 having a Mw of about 30,000 g/mol, available from SABIC Innovative Plastics Plastics as PC 105 |
| Poly-carbonate II | Bisphenol A polycarbonate resin available from SABIC Innovative Plastics as LEXAN ML8199-111N |
| Antioxidant | Pentaerythritol betalaurylthiopropionate, CAS Reg. No. 29598-76-3, available from Ciba Specialty Chemicals as SEENOX 412S |
| MBS | Methylmethacrylate-butadiene styrene impact modifier available as Paraloid EXL-3650A from the Dow Chemical Company |
| LLDPE | Linear low density polyethylene, from Nova Chemicals, Corp |
| Hindered Phenol Stabilizer | Pentaerythritol- tetrakis(3-(3,5-di-tert-butyl-4-hydroxy-phenyl-)propionate), CAS Reg. No. 6683-19-8, available from BASF Corp. |
| Quencher | Phosphorous Acid (45 percent in water), available from Brenntag Mid-South, Inc. |

Extrusion, Molding, and Testing

For the compositions disclosed herein, ingredients were tumble blended and then extruded on 27 mm twin-screw extruder with a vacuum vented mixing screw, at a barrel and die head temperature between 240 to 265° C. and a 300 rpm screw speed. The extrudate was cooled through a water bath prior to pelletizing. ASTM tensile, Izod and flexural bars were injection molded on a van Dorn molding machine with a set temperature of approximately 240-265° C. The pellets were dried for 3-4 hours at 120° C. in a forced air-circulating oven prior to injection molding.

Notched and un-notched Izod testing was done on 75 mm×12.5 mm×3.2 mm bars using ASTM method D256 at both 23° C. and −30° C. using 5 lbf/ft pendulum energy.

Tensile properties were measured according to ASTM D 638 at 23° C. and 50 mm/min speed for 5 mm/min for K4560 examples.

Flexural properties were tested per ASTM D790 with 3.2 mm thickness specimen and 1.27 mm/min speed.

Specific gravity was measured per ASTM D792.

Vicat softening temperature was tested per ASTM D1525 with 10 N load and 50° C./Hour temperate rate. Vicat temperature was tested on both regular molded examples as well as abusively molded examples. Abusive molding here refers to molding conditions that have 15° C. higher barrel temperature and double dwelling time than regular molding.

Heat deflection temperature (HDT) was tested per ASTM D648 with 1.82 MPa stress on 3.2 mm thickness specimens.

Melt volume-flow rate (MVR) was tested per ASTM D1238 at 250° C. with 5 kg load and 240 s dwell time.

Melt viscosity was determined as a function of time at 265° C. for 30 minutes. This test is also known as "time-sweep". Percent viscosity change was reported.

Differential scanning calorimetry (DSC) analysis was conducted on all examples with a ramp rate of 20° C./min and temperature range of 40 to 300° C.

Hydrolysis Tests. Tensile and Izod bars were aged in a hydro-oven at 80° C. and 80% relative humidity. Specimens were drawn at 500 hours, 750 hours and 1000 hours.

Part A. Reference Process for Preparing PBT 1,4-Butanediol (BDO, 10 lbs) and tetraisopropyl titanate (TPT, 9.5 mL) and additional BDO (4 lbs) was added to a Helicone reactor. The resulting mixture was agitated under a positive pressure of nitrogen at atmospheric pressure at 130° C. for 45 minutes. Dimethyl terephthalate (DMT, 25.8 lbs) was then added to the reactor, along with additional BDO (6 lbs), and the temperature is maintained at 130° C. When the addition was complete, the temperature was increased to 225° C. and agitation was continued at 67 percent of maximum.

The reaction mixture was then heated at reflux for 2 hours at approximately 220° C. The temperature of the reaction mixture is then increased to 250° C. The speed of the agitator was set to 60 percent of maximum and the target amps of the motor was set at 3.5 amps.

The polymerization stage was then initiated. The pressure was adjusted to less than 1 torr for 180 minutes. The reaction was allowed to proceed until the polymer mass reached approximately 3 build. The polymer melt was then drained out from the bottom of the reactor into a cooling bath of water at room temperature. The solidified polymer was then ground into pellets. The resulting resin had an intrinsic viscosity of 1.25 dL/min and melting temperature of 225° C.

Part B. Improved Process for Preparing of PBT Using 1,4 Butanediol and Dimethyl Terephthalate and an In-Situ Catalyst 10 pounds of 1,4-Butanediol (BDO) and 1.87 g of 1 M aqueous phosphoric acid were added to a Helicone reactor. The resulting mixture was agitated under a positive pressure of nitrogen at atmospheric pressure at 130° C. After 20 minutes, 9.5 mL tetraisopropyl titanate (TPT) and additional BDO (4 lbs) were added to the reactor. The resulting mixture was held at 130° C. for 45 minutes. The experimental molar ratio between phosphoric acid and TPT was 0.65. Dimethyl terephthalate (DMT, 25.8 lbs) was then added to the reactor, along with additional BDO (6 lbs), and the temperature was maintained at 130° C. When the addition was complete, the temperature was increased to 225° C. under nitrogen. The agitator speed was then set at 67 percent of maximum.

The reaction mixture was heated at reflux for 2 hours at approximately 220° C. It should be noted that the design of the overhead condenser system did not allow a complete reflux of the BDO. As a result, in the initial stages, about 5 to 10 lbs (2.3 to 4.5 kg) of BDO were collected. The temperature of the reaction mixture was then increased to 250° C. The speed of the agitator was set to 60 percent of maximum and the target amps of the motor was set at 3.5 amps.

The polymerization stage was then initiated. The pressure was adjusted to less than 1 torr for 180 minutes. The reaction was allowed to proceed until the polymer mass reached close to 3 build. The polymer melt was then drained out from the bottom of the reactor into a cooling bath of water at room temperature. The solidified polymer was then ground into pellets. The resulting resin had an intrinsic viscosity of 1.25 dL/min and a melting temperature of 225° C.

Part C. Hydrostability Studies of Compositions PBT Prepared According to Process B Because semi-crystalline polyester-polycarbonate blend products are used in outdoor equipment housings as well as in automotive and outdoor vehicles and devices (OVAD), it is important that they are hydrostable. Hydrolysis of PBT-PC blends leads to loss of molecular weight and reduced mechanical performance. The presence of acid in the formulation or even the carboxyl end group of the polyesters can catalyze the degradation of polyesters in the humid environment. Since one of the reaction products of polyester hydrolysis is itself a carboxylic acid, the hydrolytic decomposition of PBT is autocatalytic, as depicted previously in Scheme 1.

The transesterification reaction between polyesters and polycarbonate in the melting state can result in the formation of copolymers, lower heat performance, and slower crystallization. The transesterification reaction is catalyzed by acid, base, and titanium catalyst residues in the polyesters. Quenchers are used as additives to control transesterification in PB-PC blends. Quenchers include "buffered" acid quenchers such as MZP [mono zinc phosphate [$Zn(H_2PO_4)_2$] as well as strong acids such as phosphorous acid ($H_3PO_3$) and phosphoric acid ($H_3PO_4$). Non-acidic quenchers such as TPS [tetrapropoxysilane] have also been used. EP Patent 02 72417 teaches the use of polyols as catalyst quenchers. Various other polyols $R-(OH)_x$ can also be used to quench titanium, but they lead to polymer degradation and discoloration.

We investigated whether hydrolytic stability could be improved in the PB-PC blends by using PB that is prepared using the new titanium based catalyst as described herein.

Table 2 summarizes the blends that were tested and their mechanical properties. PC-PBT blends were prepared using PBT prepared according to the new process described herein. MBS was added as an impact modifier. Phosphorous acid (0.08 weight % of a 45% phosphorous acid in water) was used as a quencher to prevent/control transesterification reaction between PC and PBT. Formulations without quenchers were also prepared.

TABLE 2

| Item | Unit | CE-1 Quencher | CE-2 No Quencher | E-3 Quencher | E-4 No Quencher |
|---|---|---|---|---|---|
| PC-I | % | 37.41 | 37.41 | 37.41 | 37.41 |
| PE-I | % | 31.22 | 31.3 | 0 | 0 |
| PC-II | % | 19.16 | 19.16 | 19.16 | 19.16 |
| Pentaerythritol beta-laurylthiopropionate | % | 0.05 | 0.05 | 0.05 | 0.05 |
| Hindered Phenol Stabilizer | % | 0.08 | 0.08 | 0.08 | 0.08 |
| PA 45% | % | 0.08 | 0 | 0.08 | 0 |
| LLDPE | % | 2 | 2 | 2 | 2 |
| Global MB | % | 10 | 10 | 10 | 10 |
| PE-II | % | 0 | 0 | 31.22 | 31.3 |

As provided in Table 3, the examples showed equivalent mechanical properties with the respect to flexural, impact (both room temperature and low temperature), and tensile properties. In "time-sweep" results, CE-2 showed a much higher viscosity drop (37%) after 30 minutes at 265° C. compared with other three examples. In DSC results, CE-2 clearly showed a much lower onset crystallization temperature (Tc) on cooling and a much smaller heat of crystallization (delta Hc) than the other three examples. This is a strong indication that PBT crystallization becomes more difficult due to chain irregularity caused by the formation of a large polyester carbonate phase due to extensive transesterification between PBT and PC. Also, CE-2 showed a largely decreased HDT compared to the other three examples. This can also be explained by the lower degree of crystallinity in example CE-2.

TABLE 3

| Item | Unit | CE-1 Quencher | CE-2 No Quencher | E-3 Quencher | E-4 No Quencher |
|---|---|---|---|---|---|
| Flexural Modulus | MPa | 2090 | 2100 | 2100 | 2090 |
| Flex Stress@5% Strain | MPa | 77 | 77 | 77 | 76 |
| Flexural Stress@Yield | MPa | 78 | 78 | 78 | 78 |
| Notched Izod Ductility, 23° C. | % | 100 | 100 | 100 | 100 |
| Notched Izod Impact Strength, 23° C. | J/m | 650 | 711 | 656 | 681 |
| Notched Izod Ductility, −30° C. | % | 100 | 100 | 100 | 100 |
| Notched Izod Impact Strength, −30° C. | J/m | 607 | 637 | 646 | 634 |
| Modulus of Elasticity | MPa | 1978 | 2050 | 1986 | 1954 |
| Tensile Strength at Yield | MPa | 47 | 51 | 51 | 50 |
| Tensile Strength at Break | MPa | 53 | 54 | 49 | 55 |
| % Elongation at Yield | % | 4.7 | 4.7 | 4.8 | 4.9 |
| % Elongation at Break | % | 150 | 150 | 121 | 152 |
| Rheological | | | | | |
| MVR | cm$^3$/10 min | 19 | 21 | 22 | 18 |
| Viscosity Change after time-sweep (265° C. for 30 minutes) | % | −17 | −37 | −17 | −20 |
| Thermal | | | | | |
| Onset Melting Temp (Tm) | ° C. | 224 | 224 | 224 | 224 |
| Heat of Fusion/Melting (delta Hf) | J/g | 16.4 | 15.3 | 15.9 | 14 |
| Onset Crystallization Temp (Tc) | ° C. | 186 | 152 | 183 | 187 |
| Heat of Crystallization (delta Hc) | J/g | −9.3 | −3.3 | −6.3 | −8.5 |
| Peak Melting Temp (Tpm) | ° C. | 223 | 218 | 223 | 223 |
| Deflection temp | ° C. | 90 | 83 | 90 | 95 |
| VST After Regular Molding | ° C. | 144 | 142 | 150 | 151 |

TABLE 3-continued

| Item | Unit | CE-1 Quencher | CE-2 No Quencher | E-3 Quencher | E-4 No Quencher |
|---|---|---|---|---|---|
| VST After Abusive Molding | °C. | 147 | 95 | 145 | 147 |
| Delta Vicat softening temperature | % | −3 | 47 | 5 | 4 |

A more 'direct' sign of transesterification is the delta Vicat softening temperature between regular molding and abusive molding. A delta Vicat larger than 10° C. is evidence of transesterification. Comparing the 4 examples tested, CE-1, E-3, and E-4 all showed a delta Vicat less than 10° C. while CE-2 showed a Vicat temperature difference of 47° C. In E-4, no quencher was added. The only difference between the CE-2 and E-4 compositions is how the PBT that was used in the compositions was prepared.

The impact strength and ductility retention of the formulations were tested after hydro-aging at 80° C. and 80% relative humidity as summarized in Table 4. As provided in Table 4, E-4 substantially maintained its ductility after 1000 hours of hydroaging while CE-1 completely lost its ductility after 750 hours aging time. Furthermore, as provided in Table 4 and FIG. 1, E-4 retained 33% of its impact strength after 1000 hour exposure to humid environment while CE-1 almost completely lost its impact strength, with 4% left.

It also appears that CE-2 showed much better hydrostability compared with CE-1 and CE-3 and comparable hydrostability to that of E-4. This observation can be explained by the formation of polyester carbonate chains and the reduction of carboxylic acid end group concentration due to the high extent of transesterification between two phases in CE-2. CE-2 showed inferior heat performance and much less melt stability. The reason that E-4 showed much better hydrostability than CE-1 is because the residual titanium in the PBT (PE-II) is effectively 'deactivated' prior to blending, which eliminates the need for the acid quencher additive. As a result, the hydrolysis resistance of PBT is improved.

TABLE 4

| 80° C. 80% RH | Properties | Unit | CE-1 Quencher | CE-2 No Quencher | E-3 Quencher | E-4 No Quencher |
|---|---|---|---|---|---|---|
| t = 0 | Ductility | % | 100 | 100 | 100 | 100 |
| t = 500 hr | Ductility | % | 100 | 100 | 0 | 100 |
| t = 750 hr | Ductility | % | 0 | 100 | 0 | 100 |
| t = 1000 hr | Ductility | % | 0 | 100 | 0 | 67 |
| t = 0 | Notched Impact Strength | J/m | 607 | 637 | 646 | 634 |
| t = 500 hr | Notched Impact Strength | J/m | 269 | 473 | 56 | 457 |
| t = 750 hr | Notched Impact Strength | J/m | 36 | 394 | 25 | 348 |
| t = 1000 hr | Notched Impact Strength | J/m | 22 | 289 | 14 | 208 |

The foregoing disclosure has been described in some detail by way of illustration and example for purposes of clarity and understanding. The invention has been described with reference to various specific and preferred embodiments and techniques. However, it should be understood that many variations and modifications can be made while remaining within the spirit and scope of the invention. It will be obvious to one of skill in the art that changes and modifications can be practiced within the scope of the appended claims. Therefore, it is to be understood that the above description is intended to be illustrative and not restrictive. The scope of the invention should, therefore, be determined not with reference to the above description, but should instead be determined with reference to the following appended claims, along with the full scope of equivalents to which such claims are entitled.

The invention claimed is:

1. A thermoplastic composition with improved hydrostability, comprising:
   about 31.3 percent by weight of polybutylene terephthalate prepared from dimethyl terephthalate and 1,4-butane diol in the presence of phosphoric acid (PA) and 50 to 300 ppm of tetraisopropyl titanate (TPT), wherein the polybutylene terephthalate has an intrinsic viscosity of 1.25 dL/min and a melting temperature of 225° C. and wherein the molar ratio between PA and TPT in the polybutylene terephthalate is 0.65:1;
   about 37.41 percent by weight of bisphenol A polycarbonate having a molecular weight of about 30,000 g/mol;
   about 19.16 percent by weight of bisphenol A polycarbonate having a molecular weight of about 22,000 g/mol;
   about 0.05 percent by weight of pentaerythritol betalaurylthiopropionate;
   about 0.08 percent by weight of pentaerythritol-tetrakis (3-(3,5-di-tert-butyl-4-hydroxy-phenyl-)propionate);
   about 2 percent by weight of linear low density polyethylene; and
   about 10 percent by weight of methylmethacrylate-butadiene styrene impact modifier;

wherein:
   the polybutylene terephthalate is not produced from recycled polyethylene terephthalate;
   all weight percents are based on the total weight of the composition;
   no quencher for the catalyst complex is added to the thermoplastic composition; and
   the thermoplastic composition gives a Delta Vicat Softening temperature according to ASTM D1525 of less than 10° C. and retains 33 percent of its impact strength according to ASTM D256 after 1000 hours of hydroaging at 80° C. and 80 percent relative humidity as compared to a thermoplastic composition that is identical in all respects except that the catalyst used to prepare the polybutylene terephthalate is tetraisopropyl titanate.

2. An article prepared from the thermoplastic composition of claim 1.

* * * * *